US005506037A

United States Patent [19]
Termath

[11] Patent Number: 5,506,037
[45] Date of Patent: * Apr. 9, 1996

[54] HEAT-REFLECTING AND/OR ELECTRICALLY HEATABLE LAMINATED GLASS PANE

[75] Inventor: Gunter Termath, Gelsenkirchen, Germany

[73] Assignee: Saint Gobain Vitrage International, Courbevoie, France

[ * ] Notice: The portion of the term of this patent subsequent to Dec. 21, 2010, has been disclaimed.

[21] Appl. No.: 59,427

[22] Filed: May 7, 1993

Related U.S. Application Data

[63] Continuation-in-part of Ser. No. 623,859, Dec. 7, 1990, Pat. No. 5,271,994.

[30] Foreign Application Priority Data

Dec. 9, 1989 [DE] Germany ........................ 39 40 748.9
May 9, 1992 [DE] Germany ........................ 42 15 337.9

[51] Int. Cl.⁶ ........................................... B32B 7/02
[52] U.S. Cl. .................... 428/216; 359/360; 359/585; 428/336; 428/425.6; 428/432; 428/433; 428/434; 428/437; 428/469; 428/472; 428/699701; 428/702
[58] Field of Search ............................. 428/216, 31, 432, 428/434, 437, 469, 699, 433, 436, 442, 425.6, 336, 472, 701, 702; 359/360, 548, 549, 585; 65/60.2, 60.4; 296/84.1

[56] References Cited

U.S. PATENT DOCUMENTS

| | | | |
|---|---|---|---|
| 3,274,024 | 9/1966 | Hill et al. ................... | 428/433 |
| 3,826,728 | 7/1974 | Chambers et al. ............ | 428/433 |
| 3,878,079 | 4/1975 | Schauer ....................... | 204/192 |
| 3,889,026 | 6/1975 | Groth .......................... | 428/34 |
| 4,045,125 | 8/1977 | Farges ......................... | 359/360 |
| 4,332,276 | 3/1982 | Meckel et al. ............... | 428/472 |
| 4,368,945 | 1/1983 | Fujimori et al. ............. | 350/1.7 |
| 4,463,047 | 7/1984 | Matteucci et al. ............ | 428/216 |
| 4,465,736 | 8/1985 | Nishihara et al. ............ | 428/332 |
| 4,536,998 | 8/1985 | Mattecii et al. .............. | 52/171 |
| 4,654,067 | 3/1987 | Ramus et al. ................ | 65/60.5 |
| 4,688,270 | 5/1987 | Ramus ......................... | 65/106 |
| 4,702,955 | 10/1987 | Allred et al. ................ | 428/701 |
| 4,710,426 | 12/1987 | Stephens ..................... | 428/336 |
| 4,744,844 | 5/1988 | Hurst .......................... | 156/101 |
| 4,749,397 | 6/1988 | Chesworth et al. .......... | 65/60.4 |
| 4,773,717 | 9/1988 | Pai et al. ..................... | 359/580 |
| 4,782,216 | 11/1988 | Woodard ..................... | 219/547 |
| 4,799,745 | 1/1989 | Meyer et al. ................ | 350/1.7 |
| 4,844,985 | 7/1989 | Pharms et al. .............. | 428/432 |
| 4,943,140 | 7/1990 | Woodard et al. ............ | 350/164 |
| 4,943,484 | 7/1990 | Goodman ..................... | 428/441 |
| 4,973,511 | 11/1990 | Farmer et al. ............... | 428/216 |
| 5,061,567 | 10/1991 | Brochot et al. .............. | 428/216 |
| 5,061,568 | 10/1991 | Kessel et al. ................ | 428/437 |
| 5,085,926 | 2/1992 | Lida et al. ................... | 359/359 |

FOREIGN PATENT DOCUMENTS

| | | |
|---|---|---|
| 0104870 | 9/1983 | European Pat. Off. . |
| 0263623 | 4/1988 | European Pat. Off. . |
| 62-123403 | 6/1987 | Japan . |
| 63-242948 | 10/1988 | Japan . |
| WO88/01230 | 2/1988 | WIPO . |

Primary Examiner—D. S. Nakarani
Assistant Examiner—H. Thi Le
Attorney, Agent, or Firm—Pennie & Edmonds

[57] ABSTRACT

A heat reflecting and/or electrically heatable laminated glazing system having two single glass panes bonded together by a thermoplastic film such as polyvinyl butyral is disclosed. One of these two panes includes a layered construction, preferably of a conductive silver layer and an dielectric layer, preferably of zinc oxide, which is disposed on the silver layer. A bonding layer is utilized to improve the bond between the thermoplastic film and the dielectric layer. The bonding layer comprises one of the metals in groups IV, V, or VII of the periodic system or an oxide of these metals.

29 Claims, 2 Drawing Sheets

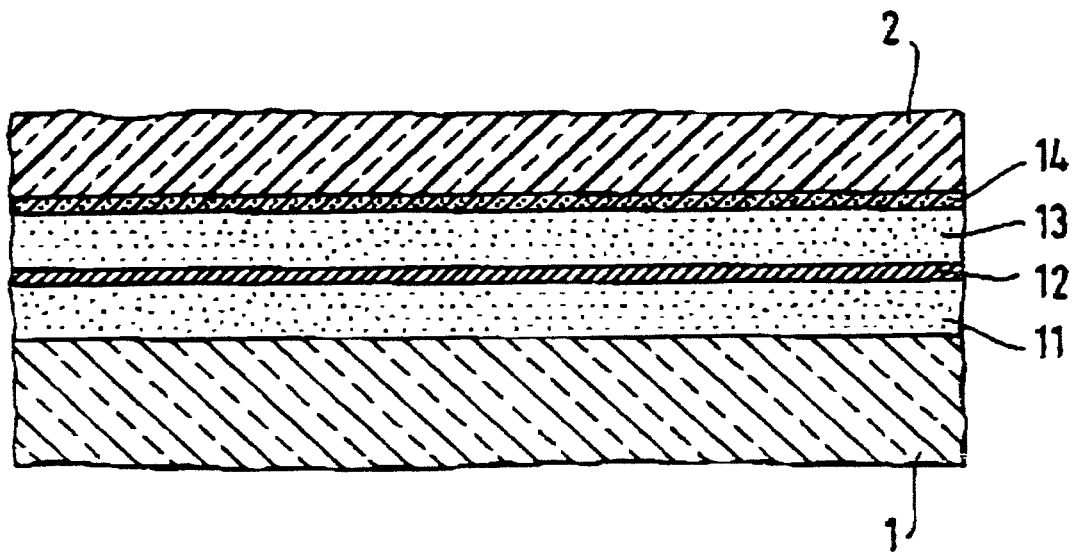
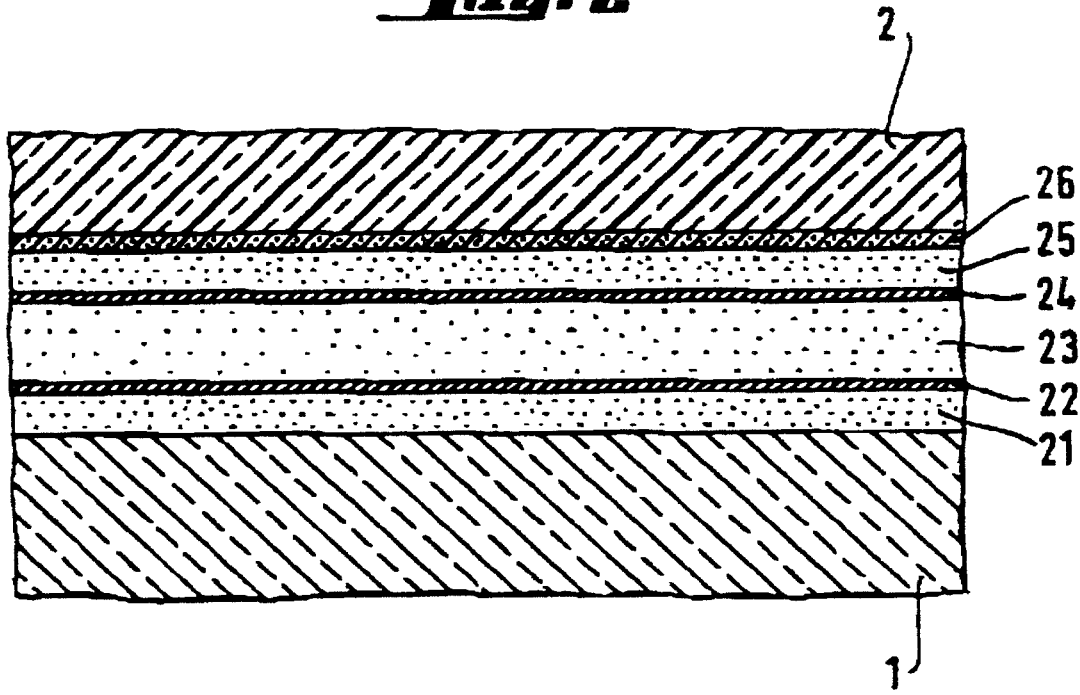

HEAT-REFLECTING AND/OR ELECTRICALLY HEATABLE LAMINATED GLASS PANE

CROSS-REFERENCE TO RELATED APPLICATION

This application is a continuation-in-part of application Ser. No. 07/623,859 filed Dec. 7, 1990 now U.S. Pat. No. 5,271,994.

BACKGROUND OF THE INVENTION

The present invention relates to a heat-reflecting and/or electrically heatable laminated glass pane or glazing, preferably for use as an automobile window or windshield.

The simplest type of laminated glazing includes two glass sheets or panes bonded together with a thermoplastic film of a material, such as polyvinyl butyral. To provide an electrically heatable laminated glazing, one of the panes is provided with a layered construction of various metal oxides. Laminated glass panes of this type are used, especially, for the glazing of automobiles, both as electrically heatable glass pane and also as heat-protective panes having a high thermal radiation reflection.

One multiple coating layer known for this purpose, which is applied by means of the magnetic field-assisted cathodic sputtering or the magnetic field-assisted reactive cathodic sputtering, possesses an dielectric coating of zinc oxide disposed on the glass surface, a silver coating disposed over this zinc oxide coating, and another dielectric covering layer of zinc oxide, applied over the silver layer, possibly with a metallic or substoichiometric metallic oxide layer between them (see U.S. Pat. No. 4,744,844). Also known and used for this purpose are multiple layers of this class comprising two silver layers, between which a further layer of zinc oxide is disposed (see WO 90/05439). To protect these silver layers from the influence of oxygen during the cathode sputtering of the dielectric layer of zinc oxide, it is known to use a this layer of a metal or an under-oxidized (i.e., sub-stoichiometric) metal oxide disposed between the silver layer and the dielectric layer, as disclosed in EP 0 104 870.

Multiple layers of silver coatings and zinc oxide coatings have proved successful in glazings for use in automobiles, because in an especially advantageous manner they have a high transmission, are relatively neutral in reflection and at the same time possess high electrical conductivity and good heat protective properties. In certain circumstances, however, the bond of the thermoplastic intermediate film to the dielectric covering layer of zinc oxide can deteriorate over of time when the construction is exposed to UV radiation. When this occurs, the safety properties of the laminated glass can thereby be jeopardized. For this reason, additional measures for improving the bond have been undertaken. In particular, the provision of an additional bond-promoting layer over the uppermost zinc oxide layer has been used to try to overcome this problem.

It is furthermore known from EP 0 263 623 to provide over the dielectric covering layer of zinc oxide, a layer of chromium oxide for improving the bond to the thermoplastic intermediate film, this bond-improving layer consisting of a complex or mixture of metallic chromium and of chromium oxides of different degrees of oxidation ($CrO$, $CrO_2$ and $CrO_3$ and $Cr_2O_3$).

The state of the art furthermore includes, in the case of laminated glass panes having the aforementioned or some other multiple layer construction, the application, as the outermost layer improving the bond to the thermoplastics intermediate film, of a layer of $Ta_2O_5$ or $SiO_x$, where x is equal to or smaller than 2 (see EP 0 434 656).

It has been found that the known bond-improving coatings are not without disadvantages. For example, in the case of some of the known bond-improving coatings, it has been found that the bond to the thermoplastic film is so greatly increased that it can reach inadmissibly high values, with the result that the penetration strength of the laminated glass pane falls below the specified values needed for automobile glazings. Others of the known bond-promoting coatings have the disadvantage that they can be applied only with difficulty by means of conventional sputtering devices. Furthermore, it has been found that some of the known bond-promoting coatings fulfill their purpose only if they are applied in a comparatively large thickness, which in turn, however, results in a reduction of the light transmission through the glazing where metallic coatings are used.

The objective of the present invention is to develop a bond-promoting coating for laminated glass panes of the initially named class, which as such on the one hand fulfills the requirements demanded of the bond of the coated glass sheet to the usual thermoplastic intermediate films over the long-term and without deterioration due to UV radiation, and which, on the other hand, can be applied without difficulty in the practical conditions of a conventional cathodic sputtering installation. Finally, the bond-promoting coating to be developed should fully achieve its effect even with comparatively small thicknesses and should not adversely influence the transmission and reflection properties of the laminated glass pane in the visible range.

SUMMARY OF THE INVENTION

The present invention relates to a laminated glazing system comprising a first glass pane which includes a layered construction thereon; and a second glass pane which includes a thermoplastic film thereon. The layered construction comprises a first metal layer, a first dielectric layer disposed on the first metal layer, and a bonding layer for bonding the layered construction to the thermoplastic film, while the bonding layer comprises at least one metal from groups IV, V, or VIII of the periodic system or an alloy or oxide of these metals.

Preferably, the first metal layer is iron, nickel, chromium, an alloy of those metals, stainless steel or silver, while the first dielectric layer is a metal oxide or nitride, most preferably zinc oxide, tin oxide, indium tin oxide, tantalum oxide, titanium dioxide or titanium nitride. Useful thermoplastic films include polyvinyl butyral, a polyurethane or polyvinyl chloride.

The bonding layer can be an oxide of at least one metal from groups IV, V, or VIII of the periodic system, with titanium dioxide or tin oxide being preferred. Also, the bonding layer can be zinc or at least one metal from groups IV, V, or VIII of the periodic system, preferably titanium, tantalum, or a nickel-chromium alloy.

In another embodiment of the invention, the layered construction also includes a second metal layer disposed upon the first dielectric layer and a second dielectric layer disposed on the second metal layer. The preferred components of these layers would be the same as those of the first layers. A particularly preferred arrangement includes those in which the first metal layer is silver, the second metal layer is silver, the first dielectric layer is zinc oxide, the second dielectric layer is zinc oxide, and the bonding layer is titanium dioxide, tantalum oxide or tin oxide.

A preferred arrangement of the first embodiment is one in which the first metal layer is silver, the first dielectric layer is zinc oxide, and the bonding layer is titanium dioxide, tantalum oxide or tin oxide. This construction may also include a second metal layer disposed upon the first dielectric layer with a bonding layer of tin oxide. For each embodiment of the invention, the preferred thickness of the bonding layer is between about 7 and 20 nanometers.

BRIEF DESCRIPTION OF THE DRAWINGS

Various examples of embodiment of the invention are described below in more detail by reference to the drawings, each of which is in the form of a cross-section through a laminated glass pane in the region of the multiple layer, and wherein:

FIG. 1 is a laminated glass pane having a multiple layer consisting of four layers;

FIG. 2 is a laminated glass pane having a multiple layer consisting of six layers;

DETAILED DESCRIPTION OF THE INVENTION

Figure 3:
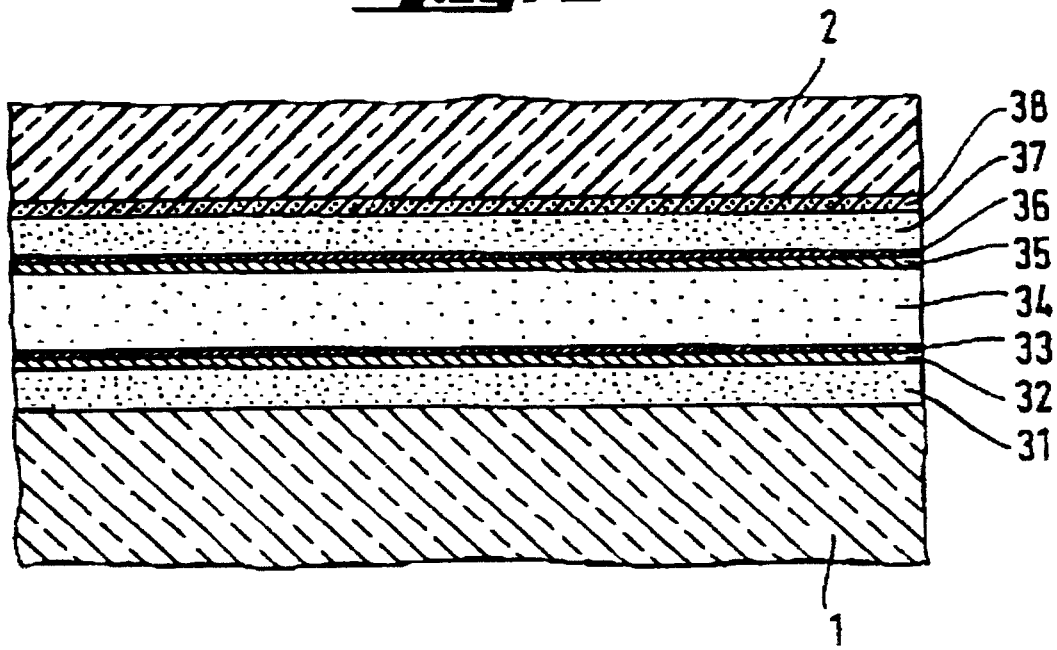
FIG. 3 is a laminated glass pane having a multiple layer consisting of eight layers.

The objective of the present invention is to provide a laminated glass pane including a bonding layer for improving the bond between the dielectric layer and the thermoplastic film. Such bond-improving layers have properties equal to or better than those of the known bond-improving layers of chromium oxide and can be applied without difficulty by cathodic sputtering.

According to the present invention, this objective is achieved by including in the layered construction a bond layer of one of the metals of groups IV, V or VIII of the periodic system, or of an oxide of one of these metals. This would preferably include metals or oxides of titanium, zirconium, hafnium, vanadium, niobium, tantalum, iron, cobalt, nickel, tin, antimony, bismuth and lead, although it is believed that the other elements in these groups can instead be used, if desired. It has been found that bond-improving layers containing these preferred elements provide a bond strength between the dielectric layer and the thermoplastic film that essentially corresponds to the bond strength found between an uncoated glass surface and the film.

While the bond improving layers act to improve the bond strength, metal coatings utilized in these layers can have an adverse influence upon the light transmission and light reflection of the glazing. Therefore, it is advisable to the limit the metal layer thickness to the order of 10 to 30 Angstroms to avoid an adverse distortion of the desired optical properties of the glazing (i.e., light transmission, and intensity and spectral distribution of a reflected component of incident light).

Since layers of metal oxide have a substantially greater transparency than layers of metal, the bond-improving layers may have a greater thickness to the extent to which their degree of oxidation increases. Metal oxide layers in which the metal is fully oxidized throughout, that is to say is stoichiometrically oxidized, may have a substantially greater thickness than 30 Angstroms. In stoichiometric metal oxide layers, the desired properties of the laminated glazing, namely no reduction or only a negligibly small reduction in the light transmission and also no change in color in transmission or in reflection by the bond-improving layer, are found in layers up to a thickness of approximately 100 Angstroms depending upon the type of metal.

Good properties with respect to bond strength improvement and desired optical properties of the laminated glazing can be achieved if the bond-improving layer is made of titanium, nickel, an alloy of nickel and chromium, or of an oxide of one of these metals. Zinc metal can also be used, as can other alloys of the aforementioned metals. Especially favorable results are achieved if the bond-improving layer is made of an oxide, preferably titanium dioxide, tantalum oxide or tin oxide. As noted above, other transition metal oxides can be used, if desired.

According to another aspect of this invention, the bonding layer is most preferably a coating of tin oxide. It has been found that by sputtering even a comparatively thin film of tin oxide onto the dielectric covering layer of zinc oxide, all the requirements which are demanded of the bonding layer are fulfilled. In particular, the process conditions in the sputtering process can be readily achieved, because tin oxide films as such have previously been used an dielectric coating in multiple layer systems. A surprising aspect is, however, the extraordinarily favorable effect of the tin oxide film as a bond-promoting film over a film of zinc oxide. This favorable effect possibly is based upon the fact that tin oxide has an especially high barrier effect against oxygen ions, which are present in the zinc oxide film and which, under the influence of UV radiation, diffuse within the zinc oxide film to cause a reduction in bond strength. Experiments have shown that, even with a layer thickness of 7 nanometers, good bonding results bond after UV-irradiation are achieved. Preferably, the tin oxide film is applied in a thickness of 12 to 20 nanometers.

The tin oxide of the bond-improving coating may, depending upon the process conditions of the reactive cathodic sputtering chosen in the individual case, be present either as a stoichiometric $SnO_2$ or as a substoichiometric oxide. In both cases the function of bond promotion is completely fulfilled.

A further embodiment of this invention relates to the use of more than one anti-reflecting layer of, e.g., zinc oxide. For this embodiment, a thin film of tin oxide is applied onto the layer of zinc oxide which faces the second glass pane. If another layer of zinc oxide is provided beneath the silver layer, then a tin oxide layer also may be incorporated between that zinc oxide layer and the silver layer, which in this case also exerts its blocking action against oxygen ions. In this manner, the construction is able to counteract aging which in the course of time is produced by the penetration of oxygen from the lower zinc oxide layer into the silver layer. In addition, if the second dielectric layer is tin oxide, it can also serve as the bonding layer.

The laminated glass panes shown in the figures each include a glass sheet 1, provided with the multiple layer, which glass sheet is bonded, on the coated face, by a thermoplastic film 2 to a second glass sheet (not shown). The thermoplastic intermediate films 2 are well known to those skilled in the art and would typically include a polyurethane, a conventional thermoplastic such as PVC, or other materials. In the examples described below, polyvinyl butyral is used as it is highly advantageous for these applications. The bonding of the glass sheets together is performed in the known manner by the use of heat and pressure in an autoclave.

The layered construction which is disposed directly on the first glass plate by means of cathodic sputtering, illustratively consists of a stack of coatings, including at least one metal layer, preferably of iron, nickel, chromium, an alloy of those metals such as stainless steel, or silver, and has a thickness of between about 5 and 100 nm. Then, a dielectric layer is disposed upon the metal layer for use either as a protective layer or as an optical layer to modify or even cancel the reflection due to the metal layer. The dielectric layer is made of a non-conductive oxide or nitride, preferably zinc oxide, tin oxide, tantalum oxide, indium tin oxide, titanium dioxide or titanium nitride, and has a thickness of about 35 nm. A bonding layer comprised of a metal or metal oxide is disposed upon the dielectric layer, and is used to increase the bond to the thermoplastic layer. These layers are applied by means of cathodic sputtering. It is also possible to deposit a coating of a dielectric material such as tin oxide onto the first glass pane prior to the deposition of the layered construction thereon. In the manufacture of coated glass, for example, the surface would initially be provided with a dielectric coating, and the stack of layers of metal, additional dielectric and bonding layer placed thereupon. Of course, the bonding layer would face the thermoplastic film of the second glass pane for bonding thereto.

The improvement in the bonding properties of the coated glass sheet 1 to the intermediate film 2 of polyvinyl butyral achieved by the measures according to this invention and also the transmission values measured in each case, will be found in the following examples.

EXAMPLES

The measurement of the transmission in the range of visible light is carried out with the use of commercially available measuring equipment. For measuring the bond values between the coated glass surface and the polyvinyl butyral film, the commonly employed pummel test is used. In this test, the laminated glass panes are hammered with a 300 g hammer on their surface at a temperature of −20 degrees Celsius and the quantity of broken glass fragments still adhering to the polyvinyl butyral film after this hammering is assessed. If no broken glass adheres to the polyvinyl butyral film, the pummel value is zero; if the polyvinyl butyral film is completely covered with glass crumble, the pummel value is ten. In order to comply with the safety properties, the pummel value must be at least about four which corresponds to a proportion of area of 40% on which the broken glass still adheres.

In carrying out the tests, the specimens are subjected to a long-term irradiation with UV radiation and the bond values are determined after respective irradiation periods of 500, 1,000 and 2,000 hours. The irradiation is carried out with an accelerated weathering appliance according to DIN 53 231 or DIN 53 387, respectively, and ASTM G 26 with a wavelength of 340 nanometers and an intensity of radiation of 0.35 W/m$^2$.

Example 1

A laminated glass pane having the multilayer construction illustrated in FIG. 1 is produced, in which the multiple layer on the glass sheet 1 comprises a 35 nm thick dielectric layer 11 of zinc oxide, a 15 nm thick silver layer 12, a 35 nm thick dielectric layer 13 of zinc oxide and a 16 nm thick bond-promoting layer 14 of tin oxide. The individual layers 11 to 14 are applied by the method of magnetic field-assisted cathodic sputtering onto the glass sheet 1.

The laminated glass pane has a transmission degree of 65%. The pummel values before the commencement of irradiation are about 8. After an irradiation time of 2,000 hours, the pummel values are reduced to about 7.

Comparison Example A

As a reference, a laminated glass specimen as described in Example 1 is used, but without the tin-oxide bond-promoting layer. The reference specimen has a transmission degree of 77X. The pummel value for the boundary surface between the coated glass sheet and the polyvinyl butyral film before irradiation had value of only about 3. After an irradiation time of only 100 hours, the pummel value fell to about 1 and it retains this value substantially unchanged. The pummel value on the other side of the polyvinyl butyral film, that is to say at the interface between polyvinyl butyral film/uncoated glass surface, before irradiation was about 8; after an irradiation time of 2,000 hours this pummel value fell to somewhat below 8 and was maintained substantially unchanged thereafter.

Example 2

A laminated glass pane having a layered construction as illustrated in FIG. 2 is produced. On the glass sheet 1 are applied, firstly, an approximately 30 nm thick dielectric layer 21 of zinc oxide, over this an approximately 9 nm thick silver layer 22, over this an approximately 80 nm thick intermediate layer 23 of zinc oxide, then again an approximately 9 nm thick silver layer 24, on this an approximately 30 nm thick dielectric covering layer 25 of zinc oxide, and over this dielectric covering layer 25 of zinc oxide an approximately 12 nm thick bond-promoting layer 26 of tin oxide is applied, all by the cathodic sputtering process. The glass sheet 1, coated with this multilayer construction, is bonded by the thermoplastic film 2, again polyvinyl butyral, to a further glass sheet with application of heat and pressure to form the laminated glass pane.

The measurement of light transmission gives a transmission value of 70%. The pummel value on the laminated glass pane before the commencement of UV irradiation is about 8. After an irradiation time of 2,000 hours, the pummel is still about 7.

Example 3

A laminated glass pane having a layered construction consisting of eight layers is produced, as illustrated in FIG. 3. The multiple layer disposed on the glass sheet 1 comprises an approximately 30 nm thick dielectric layer 31 of zinc oxide, a first approximately 9 nm thick silver layer 32, an approximately 3 nm thick layer 33 of metallic zinc, an approximately 80 nm thick intermediate layer 34 of zinc oxide, a second, approximately 9 nm thick silver layer 35, an approximately 3 nm thick layer 36 of metallic zinc, an approximately 30 nm thick dielectric layer 37 of zinc oxide and, as the uppermost layer of the multilayer construction, an approximately 12 nm thick bond-promoting layer 38 of tin oxide. The glass sheet 1, coated with this multilayer construction, is bonded by a thermoplastic film 2 of polyvinyl butyral under the action of heat and pressure to a further glass sheet to form the laminated glass pane.

The measurement of light transmission gives a value of 78.0%. The pummel value before irradiation is 8 and after an irradiation period of 2,000 hours is 7.

Example 4

Figure 4:
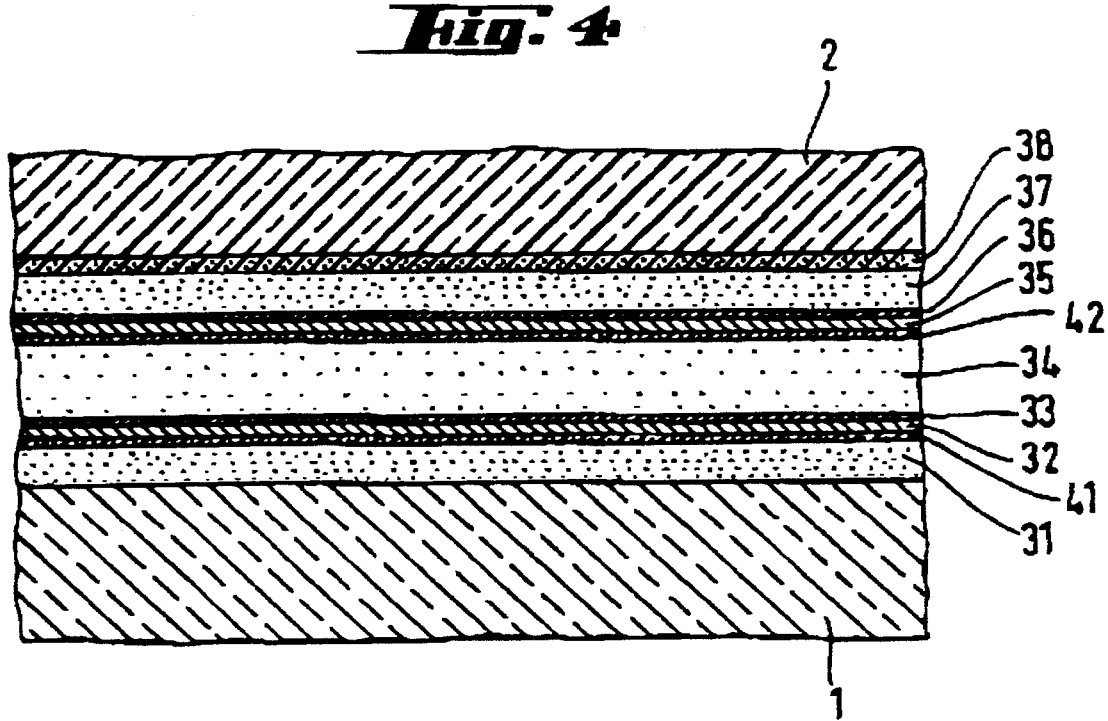
FIG. 4 is a laminated glass pane having a multiple layer consisting of ten layers.

A laminated glass pane having a multilayer construction of a total of ten layers is produced, as illustrated in FIG. 4. The multiple layer has the same layers 31 to 38 as the multilayer construction described in Example 3. In addition, between the dielectric layer 31 and the silver layer 32, a layer 41 approximately 6 nm thick of tin oxide is incorporated, and between the intermediate layer 34 of zinc oxide and the silver layer 35, another approximately 6 nm thick layer 42 of tin oxide is incorporated.

The measurement of light transmission gives a transmission degree of 78%. The pummel test on the laminated glass pane, before the commencement of UV irradiation, gives a value of about 8. After an irradiation period of 2,000 hours, the pummel value is still about 7.

Example 5

A specimen pane of a first glass sheet having a first metal layer of silver of a thickness of about 80 Angstroms and a first dielectric layer of zinc oxide at a thickness of about 350 Angstroms, was used for Examples 5–9 for testing different bonding layers. In Example 5, a bonding layer of approximately 20 Angstroms thick metallic titanium was applied between the layered construction and the polyvinyl butyral film of the second glass sheet. The degree of transmission of the specimen pane was 77%. The Pummel value before the commencement of radiation was approximately 8, and decreased to approximately 7 after a radiation exposure of 200 hours, and decreased to approximately 6 after a radiation exposure of 400 hours.

Example 6

The specimen pane was tested having a bonding layer of titanium dioxide approximately 40 Angstroms thick. The titanium oxide layer was sputtered onto the pane by reactive cathode sputtering of a titanium target in a high vacuum possessing a slight partial pressure of oxygen. Again, the degree of transmission was 77%. The Pummel value was approximately 7.5 before radiation, and decreased to approximately 6.5 after a radiation time of 200 hours, and approximately 5 after a radiation time of 400 hours.

Example 7

The specimen pane was provided with a substantially metallic nickel-chromium bonding layer which was produced by cathode sputtering of a target of a nickel-chromium alloy comprising 80% nickel and 20% chromium. The thickness of the nickel-chromium layer was about 15 Angstroms. The degree of transmission was 75.4%. The Pummel value before radiation was approximately 4; and during the course of radiation, exposure decreased slightly below this value.

Example 8

The specimen pane was tested having a coating of metallic tantalum approximately 15 Angstroms thick. Light transmission was about 77% and had a tendency to increase slightly. The Pummel value before the commencement of radiation was 8, and this Pummel value remained unchanged during a radiation exposure of 400 hours.

Example 9

The specimen pane was provided with a bonding layer produced by means of reactive cathode sputtering using a metallic tantalum target to produce a bond-improving layer of tantalum oxide approximately 50 Angstroms thick. In comparison with the reference specimen, the degree of transmission tended to increase slightly in this specimen. Also, the bond strength established by the Pummel test demonstrated an extraordinarily good bond with Pummel values of 8 even after a radiation exposure of 400 hours.

While it is apparent that the invention disclosed herein is well calculated to fulfill the objects stated above, it will be appreciated that numerous embodiments and modifications may be devised by one skilled in the art. For example, one skilled in the art could select thermoplastic layers other than the preferred polyvinyl butryal, another dielectric layer instead of the preferred zinc oxide, or other metal layers besides the preferred silver. Accordingly, it is intended that the appended claims cover all such modifications and embodiments as fall within the true spirit and scope of the present invention.

What is claimed is:

1. A laminated glazing pane comprising:
    a first glass pane which includes a layered construction bonded thereon; and
    a second glass pane which includes a thermoplastic film thereon;
    wherein the layered construction comprises a first metal layer, a first dielectric layer disposed on the first metal layer and a bonding layer directly bonded to the first dielectric layer and in contact with the thermoplastic film;
    wherein said bonding layer comprises (1) zinc, (2) tin oxide, (3) at least one metal from the groups IV, V, or VIII of the periodic system and an alloy of these metals, or (4) an oxide of the metals of groups V or VIII; and
    wherein the bonding layer bonds the layered construction to the thermoplastic film and comprises a material which is different than that of the dielectric layer.

2. The laminated glass pane according to claim 1, wherein the first metal layer is iron, nickel, an alloy of those metals, stainless steel or silver.

3. The laminated glass pane according to claim 1, wherein the first dielectric layer is a metal oxide or nitride.

4. The laminated glass pane according to claim 3, wherein the first dielectric layer is zinc oxide, tin oxide, indium tin oxide, tantalum oxide, titanium dioxide or titanium nitride.

5. The laminated glass pane according to claim 1, wherein the thermoplastic film is polyvinyl butyral, a polyurethane or polyvinyl chloride.

6. The laminated glass pane according to claim 1, wherein the bonding layer is an oxide of at least one metal from groups V or VIII of the periodic system.

7. The laminated glass pane according to claim 1, wherein the bonding layer is tin oxide.

8. The laminated glass pane according to claim 1, wherein the bonding layer is zinc or at least one metal from groups IV, V, or VIII of the periodic system.

9. The laminated glass pane according to claim 1, wherein the bonding layer is titanium, tantalum, zinc or a nickel-chromium alloy.

10. The laminated glass pane according to claim 1, wherein the layered construction further comprises a second dielectric layer disposed upon the first metal layer and a second metal layer disposed on the second dielectric layer, wherein the second dielectric layer and the second metal layer are positioned between the first metal layer and the first dielectric layer.

11. The laminated glass pane according to claim 10, wherein the second metal layer is iron, nickel, an alloy of those metals, stainless steel or silver.

12. The laminated glass pane according to claim 10, wherein the second dielectric layer is a metal oxide or nitride.

13. The laminated glass pane according to claim 12, wherein the second dielectric layer is zinc oxide, tin oxide, indium tin oxide, tantalum oxide, titanium dioxide or titanium nitride.

14. The laminated glass pane according to claim 10, wherein the thermoplastic film is polyvinyl butyral, a polyurethane or polyvinyl chloride.

15. A laminated glazing pane comprising:

a first glass pane which includes a layered construction bonded thereon; and a second glass pane which includes a thermoplastic film of polyvinyl butyral, a polyurethane or polyvinyl chloride thereon;

wherein the layered construction comprises a first metal layer of iron, nickel, an alloy of iron or nickel, stainless steel or silver, a first dielectric layer of zinc oxide, tin oxide, indium tin oxide, tantalum oxide, titanium dioxide or titanium nitride disposed on the first metal layer, and a bonding layer directly bonded to the first dielectric layer and in contact with the thermoplastic film;

wherein said bonding layer comprises at least one metal from groups IV, V, or VIII of the periodic system, an alloy of these metals, zinc, tin oxide, or a metal oxide from groups V or VIII metals; and wherein the bonding layer bonds the layered construction to the thermoplastic film and comprises a material which is different than that of the dielectric layer.

16. The laminated glass panel according to claim 15, wherein the bonding layer is tin oxide, or an oxide of at least one metal from groups, V, or VIII of the periodic system.

17. The laminated glass pane according to claim 15, wherein the bonding layer is zinc or at least one metal from groups IV, V, or VIII of the periodic system.

18. The laminated glass pane according to claim 15, wherein the bonding layer is titanium, tantalum, zinc or a nickel-chromium alloy.

19. The laminated glass pane according to claim 15, wherein the layered construction further comprises a second metal layer disposed upon the first dielectric layer and a second dielectric layer disposed upon the second metal layer, wherein the second metal layer and the second dielectric layer are positioned between the first dielectric layer and the first metal layer.

20. The laminated glass pane according to claim 10 or 19 wherein the first metal layer is silver, the second metal layer is silver, the first dielectric layer is zinc oxide, the second dielectric layer is zinc oxide, and the bonding layer is tantalum oxide or tin oxide.

21. The laminated glass pane according to claim 1 or 15, wherein the first metal layer is silver, the first dielectric layer is zinc oxide, and the bonding layer is tantalum oxide or tin oxide.

22. The laminated glass pane according to claim 1 or 15, wherein the bonding layer has a thickness of between about 7 and 20 nanometers.

23. The laminated glass pane according to claims 1 or 21 wherein the bonding layer is tin oxide and the layered construction further comprises a second metal layer disposed between the first dielectric layer and the first metal layer.

24. The laminated glass pane according to claim 23, wherein the layered construction further comprises a second dielectric layer disposed between the first metal layer and the second metal layer.

25. The laminated glass pane according to claims 1 or 15, wherein the layered construction further comprises a second dielectric layer disposed between the first metal layer and the first dielectric layer.

26. The laminated glass pane according to claim 25, which further comprises a second metal layer disposed upon the second dielectric layer, and a third dielectric layer disposed upon the second metal layer, wherein the third dielectric layer contacts the first glass pane.

27. The laminated glass pane according to claim 26 wherein the first and second metal layers each comprises two layers of different metals.

28. The laminated glass pane according to claim 27 which further comprises a second bonding layer of a material which is different than that of the second dielectric layer, and a third bonding layer of a material which is different than that of the third dielectric layer; wherein the second bonding layer is disposed between the layered construction and the second dielectric layer, and the third bonding layer is disposed between the second metal layer and the third dielectric layer.

29. The laminated glass pane according to claim 1 or 15 wherein the bonding layer comprises tin oxide.

* * * * *